United States Patent [19]

Rose

[11] 4,419,486
[45] * Dec. 6, 1983

[54] SULPHONATED POLYARYLETHERKETONES

[75] Inventor: John B. Rose, Letchworth, England

[73] Assignee: Imperial Chemical Industries PLC, London, England

[*] Notice: The portion of the term of this patent subsequent to May 19, 1998 has been disclaimed.

[21] Appl. No.: 267,288

[22] Filed: May 26, 1981

[30] Foreign Application Priority Data

Jun. 10, 1980 [GB] United Kingdom ............... 8018915

[51] Int. Cl.³ .................... C08G 65/40; C08G 65/48
[52] U.S. Cl. ................... 525/534; 528/125; 528/126; 528/128
[58] Field of Search .............. 528/125, 126, 128; 525/534

[56] References Cited

U.S. PATENT DOCUMENTS

| | | | |
|---|---|---|---|
| 3,709,841 | 1/1973 | Quentin | 528/174 |
| 4,010,147 | 3/1977 | Rose | 528/128 |
| 4,105,635 | 8/1978 | Freeman | 528/174 |
| 4,110,314 | 8/1978 | Yagi et al. | 528/174 |
| 4,175,175 | 11/1979 | Johnson et al. | 528/128 |
| 4,186,262 | 1/1980 | Freeman et al. | 528/128 |
| 4,200,728 | 4/1980 | Blinne et al. | 528/174 |
| 4,268,650 | 5/1981 | Rose | 528/128 |
| 4,273,903 | 6/1981 | Rose | 528/174 |

*Primary Examiner*—Lester L. Lee
*Attorney, Agent, or Firm*—Cushman, Darby & Cushman

[57] ABSTRACT

A polyaryletherketone polymer which is a hydrophilic sulphonated polymer derived by controllably sulphonating a copolymer having the repeat unit of formula

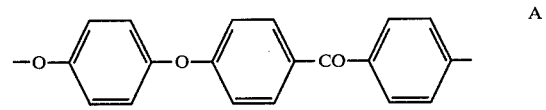

A together with the repeat unit of formula

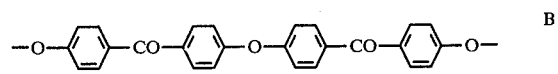

B at least 70% (preferably substantially all) of the units A being sulphonated after sulphonation and substantially all the units B remaining non-sulphonated after sulphonation. The sulphonation may be effected using 98% w/w concentrated sulphuric acid at an elevated temperature.

9 Claims, No Drawings

SULPHONATED POLYARYLETHERKETONES

The present invention relates to certain sulphonated polyaryletherketone polymers.

We have found that polyaryletherketones containing the repeat unit of formula

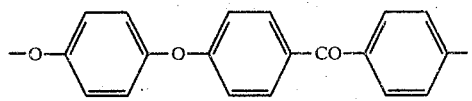

can be sulphonated under conditions such that sulphonation occurs slowly, e.g. using concentrated sulphuric acid (98% w/w) at ambient temperature.

Consequently the degree to which such a polymer can be sulphonated may be controlled under such conditions by selecting the time of sulphonation. Nevertheless, we have found that sulphonation conditions can be employed wherein these polymers sulphonate very rapidly, monosubstitution occurring in substantially all or a majority of the aromatic rings in the sub-units

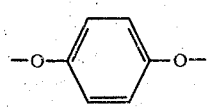

of the polymers. Rapid sulphonation of this type may be effected using concentrated sulphuric acid (98 % w/w) at an elevated temperature (e.g. $\geq 50°$ C., particularly $\geq 80°$ C.) or a more powerful sulphonating agent.

We have also found that sulphonation conditions may be employed where polyaryletherketones containing only the repeat unit of formula

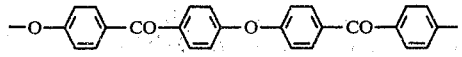

are virtually non-susceptible to sulphonation under the same conditions where the polyaryletherketones of repeat unit A are rapidly sulphonated. Consequently polyaryletherketone copolymers containing repeat units A and B may be controllably sulphonated, e.g. using concentrated sulphuric acid (98% w/w/) at an elevated temperature (e.g. $\geq 50°$ C., particularly $\geq 80°$ C.), to give hydrophilic sulphonated copolymers (ranging up to completely water soluble polymers) by varying the proportion of the repeat units B in the copolymer.

According to the present invention there is provided a polyaryletherketone copolymer which is a hydrophilic sulphonated copolymer derived by controllably sulphonating a copolymer having repeat units of formula

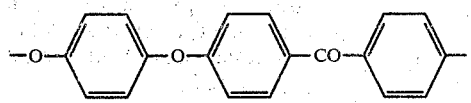

together with repeat units of formula

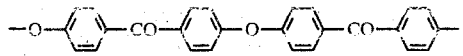

at least 70% of all the units A being sulphonated after sulphonation and substantially all the units B remaining non-sulphonated after sulphonation. Preferably substantially all (say $\geq 95\%$) the units A are sulphonated after sulphonation.

The sulphonation of the repeat units A is, e.g. very rapid in concentrated sulphuric acid (98% w/w) at an elevated temperature, while the repeat units B remain substantially non-sulphonated. Thus at least 70% of the units A are usually sulphonated within 1 hour, and at least 95% within 24 hours.

The polyaryletherketone copolymer of the invention is preferably one derived by sulphonating a copolymer which has 1 to 99 mole % of units A and, correspondingly, 99 to 1 mole % of units B, and in particular a copolymer which has 5 to 80 mole % of units A and, correspondingly, 95 to 20 mole % of units B.

The control of the sulphonation reaction should be such that the resulting copolymer preferably has a degree of hydrophilicity corresponding to a water absorption capacity at ambient temperature of about 2 weight % water absorption to complete solubility in water.

The hydrophilic copolymers of the invention (which more preferably absorb 2-40 weight % water, particularly 5-30 weight % water, at ambient temperature) are potentially useful as membrane materials, e.g. for ultrafiltration processes, e.g. desalination and removal of micro-organisms, since they are not only hydrophilic in character but retain considerable strength even when containing a significant quantity of water (e.g. up to 20 weight % water).

Ionomers of the above-defined copolymers which are sulphonated with —SO$_2$OH groups may be readily prepared e.g. by converting the —SO$_2$OH groups to salts such as SO$_3$—M$^+$ (where M= an alkali metal or NR$_4$, R being an alkyl group); these too have utility as hydrophilic polymers. Accordingly, the sulphonyl groups of the copolymers of the invention preferably have the formula —SO$_2$Y where Y is H, an alkali metal, or NR$_4$ where R is an alkyl group.

Copolymers having the repeat units A and B and inherent viscosity (IV) of at least 0.7 (measured at 25° C. as a 0.1% w/v solution in H$_2$SO$_4$ of density of 1.84 ) may be conveniently prepared by condensation of hydroquinone, 4,4'-dihydroxybenzophenone and 4,4'-difluorobenzophenone and an alkali metal carbonate or bicarbonate in the presence of an aromatic sulphone solvent at 150°—400° C.—as described in our European Patent Publication No. 0 001 879.

The present invention is now illustrated by the following examples.

EXAMPLE 1

A copolymer containing 50 mole % of repeat units A and 50 mole % of repeat units B (10 g), (IV 1.30), was added to 100 ml concentrated sulphuric acid (98% w/w). The stirred dispersion was heated to 80° C. and the copolymer had completely dissolved after 0.5 hours to yield a cherry-red solution. the solution was maintained at 80° C. for a further 0.5 hours and then poured into demineralised water whereupon a pink lace precipitated. The lace was filtered off, chopped up in a blender, washed repeatedly with demineralised water until the washings were enutral to pH paper and then the pale pink polymer dried overnight in a vacuum oven at 60° C. Analysis by 220 MHz nuclear-magnetic-resonance (nmr) spectroscopy showed that 75-80% of the repeat units A bore one —SO₂OH group on the subunits

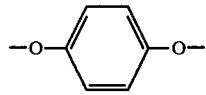

while substantially all the repeat units B were non-sulphonated. The yield of sulphonated copolymer was 8.0 g; its IV was 0.86.

EXAMPLE 2

The procedure of Example 1 was repeated except that the copolymer solution was maintained at 80° C. for 19 hours before isolation and work-up. Analysis by 220 MHz nmrspectroscopy showed that 95% of the repeat units A bore one —SO₂OH group on the subunits

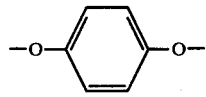

while substantially all the repeat units B were non-sulphonated. The yield of sulphonated copolymer was 9.52; its IV was 0.71.

Films were cast from solutions of the sulphonated copolymer in dimethylformamide from which films were cast. The water absorption of these films after steeping in water for 24 hours at ambient temperature ranged from 10 tp 14 weight %.

It can be predicted that results similar to those of Examples 1 to 2 are obtainable with sulphonated copolymers derived from copolymers containing 5 to 80 mole % of repeat units A and, correspondingly, 20 to 95 mole % of repeat units B.

EXAMPLE 3 (COMPARATIVE)

The procedure of Example 1 was repeated except that the copolymer dispersion was stirred in the concentrated sulphuric acid (98% w/w) for 1 hour at ambient temperature. Dissolution was observed but nmr analysis of the product after isolation and work-up as per Example 1 showed that relatively little sulphonation had occurred (about 10–20% of the repeat units A having been sulphonated).

EXAMPLE 4 (COMPARATIVE)

A homopolymer containing the repeat unit B (50 g) was dissolved in hot (80° C.) concentrated sulphuric acid (98% w/w) and the solution stirred for 24 hours at 80° C. The solution was poured into water and worked up as per Example 1. Analysis (nmr) showed it to be substantially unchanged from the starting material.

I claim:

1. A polyaryletherketone copolymer which is a hydrophilic sulphonated copolymer derived by controllably sulphonating a copolymer with concentrated sulfuric acid (98% w/w) at ≧50° C., said copolymer having repeat units of formula

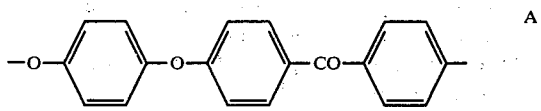

together with repeat units of formula

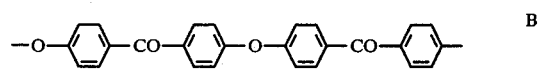

at leat 70% of the units A being sulphonated after sulphonation and substantially all the units B remaining non-sulphonated after sulphonation, the control being effected by varying the proportion of the repeat units B in the copolymer of repeat units A and B.

2. A polyaryletherketone copolymer according to claim 1 in which substantially all the units A are sulphonated after sulphonation.

3. A polyaryletherketone copolymer according to claim 1 wherein the copolymer which is sulphonated has 5 to 80 mole % of repeat units A and correspondingly 95 to 20 mole % of repeat units B.

4. A polyaryletherketone copolymer according to claim 1 having a hydrophilicity corresonding to a water absorption capacity at ambient temperature of 2 weight % water to complete solubility in water.

5. A polyaryletherketone copolymer according to claim 4 having a hydrophilicity corresponding to a water absorption capacity at ambient temperature of 5 to 30 weight % water.

6. A polyaryletherketone copolymer according to claim 1 in which the sulphonyl groups on the copolymer have the formula —SO₂OY where Y is H, an alkali metal, or NR₄ where R is an alkyl group.

7. A polyaryletherketone copolymer according to claim 1 in the form of a membrane material.

8. A process for the production of a hydrophilic sulphonated polyaryletherketone copolymer which comprises controllably sulphonating using concentrated sulphuric acid (98% w/w) at ≧50° C. a copolymer having repeat units of formula

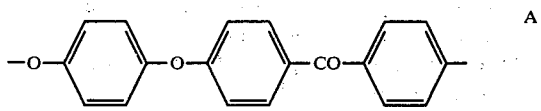

together with repeat units of formula

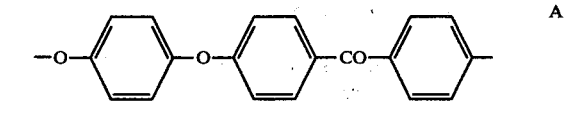

to produce a sulphonated copolymer in which at least 70% of the repeat units A are sulphonated and substantially all the repeat units B are non-sulphonated, the control being effected by varying the proportion of the repeat units B in the copolymer of repeat units A and B.

9. A process according to claim 8 wherein a sulphonated copolymer in which substantially all the repeat units A are sulphonated is produced.

* * * * *